United States Patent
Oltorik, III

(12) 
(10) Patent No.: US 11,266,138 B1
(45) Date of Patent: Mar. 8, 2022

(54) FASTENING DEVICE FOR FISHING ROD AND METHODS OF MAKING AND USING SAME

(71) Applicant: Thomas Oltorik, III, Deland, FL (US)

(72) Inventor: Thomas Oltorik, III, Deland, FL (US)

(*) Notice: Subject to any disclaimer, the term of this patent is extended or adjusted under 35 U.S.C. 154(b) by 392 days.

(21) Appl. No.: 16/279,215

(22) Filed: Feb. 19, 2019

Related U.S. Application Data

(60) Provisional application No. 62/632,879, filed on Feb. 20, 2018, provisional application No. 62/739,668, filed on Oct. 1, 2018.

(51) Int. Cl.
*A01K 87/04* (2006.01)
*A01K 87/02* (2006.01)

(52) U.S. Cl.
CPC .............. *A01K 87/04* (2013.01); *A01K 87/02* (2013.01)

(58) Field of Classification Search
CPC ................................ A01K 87/04; A01K 87/02
USPC .............................................. 43/24, 25, 25.2
See application file for complete search history.

(56) References Cited

U.S. PATENT DOCUMENTS

| | | | | |
|---|---|---|---|---|
| 173,534 A * | 2/1876 | Endicott | ................ | A01K 87/00 43/25 |
| 734,544 A * | 7/1903 | Hall | ................ | A01K 87/00 43/25 |
| 2,179,578 A * | 11/1939 | Monighan | ................ | A01K 87/00 43/25.2 |
| 2,220,395 A * | 11/1940 | Carter | ................ | A01K 87/00 403/188 |
| 2,319,462 A | 5/1943 | Kruse | | |
| 2,561,675 A | 6/1946 | Ross | | |
| 2,596,835 A | 5/1952 | Benge | | |
| 2,650,447 A * | 9/1953 | Johnson | ................ | A01K 87/04 43/24 |
| 2,715,292 A * | 8/1955 | Williams | ................ | A01K 97/06 43/25.2 |
| 2,829,461 A * | 4/1958 | Tuttle | ................ | A01K 97/06 43/25.2 |
| 3,128,023 A * | 4/1964 | Cook | ................ | A01K 97/00 225/19 |
| 3,281,981 A * | 11/1966 | Dykhouse | ................ | A01K 97/06 43/25.2 |
| 3,545,119 A | 12/1970 | Murnan | | |
| 3,581,428 A | 6/1971 | Helder | | |

(Continued)

FOREIGN PATENT DOCUMENTS

| | | | | |
|---|---|---|---|---|
| EP | 2056671 B1 * | 5/2012 | ............. | A01K 91/02 |
| FR | 1574812 A * | 7/1969 | ............. | A01K 87/04 |

(Continued)

*Primary Examiner* — Darren W Ark
(74) *Attorney, Agent, or Firm* — Mark T. Vogelbacker; Eckert Seamans Cherin & Mellott, LLC

(57) ABSTRACT

An apparatus removably attachable to a fishing rod includes a base configured to extend parallel to a shaft of a fishing rod and an eyelet extending outwardly from the base and the shaft of the fishing rod. The eyelet can be configured to receive a fishing line therethrough. The apparatus can include at least one pair of legs extending outwardly from the base. Each leg can be configured to extend around at least a portion of the shaft of the fishing rod. An opening can extend through the base. The opening can be configured to receive at least a portion of a fastener therethrough.

10 Claims, 8 Drawing Sheets

(56) References Cited

U.S. PATENT DOCUMENTS

| | | | | |
|---|---|---|---|---|
| 4,006,550 | A * | 2/1977 | Rizzo | A01K 97/125 43/17 |
| 4,041,635 | A * | 8/1977 | Savage | A01K 87/08 43/25 |
| 4,118,882 | A * | 10/1978 | Gorsky | A01K 97/125 200/61.18 |
| 4,399,631 | A * | 8/1983 | Smith | A01K 97/125 43/17 |
| 4,447,979 | A * | 5/1984 | Taylor | A01K 97/125 43/17 |
| 4,457,095 | A | 7/1984 | Stevenson | |
| 4,702,031 | A | 10/1987 | Sousa | |
| 4,726,140 | A * | 2/1988 | Mears | A01K 97/00 43/25 |
| 4,896,422 | A * | 1/1990 | Sheehan | A01K 97/00 30/290 |
| 5,033,221 | A * | 7/1991 | Barclay | A01K 75/00 43/7 |
| 5,179,797 | A * | 1/1993 | Edwards | A01K 97/125 362/191 |
| 5,182,874 | A * | 2/1993 | Powell | A01K 97/00 30/286 |
| 5,406,737 | A * | 4/1995 | Scott | A01K 91/08 43/27.4 |
| 5,448,851 | A * | 9/1995 | Nyberg | A01K 87/00 43/25.2 |
| 5,511,337 | A * | 4/1996 | Nilsson | A01K 87/00 43/25 |
| 5,570,535 | A | 11/1996 | Hodge | |
| 5,572,813 | A * | 11/1996 | Matsubara | G09F 7/18 40/317 |
| 5,735,073 | A * | 4/1998 | Kuhlman | A01K 97/12 43/17 |
| 5,855,084 | A * | 1/1999 | Huddleston | A01K 87/04 43/17.5 |
| 5,867,931 | A * | 2/1999 | Morris | A01K 97/125 43/17 |
| 5,962,817 | A * | 10/1999 | Rodriguez | G01G 19/60 177/126 |
| 6,122,853 | A * | 9/2000 | Genous-Moore | A01K 97/125 362/102 |
| 6,125,573 | A * | 10/2000 | Wilczynski | A01K 97/12 43/17 |
| 6,129,251 | A * | 10/2000 | Lajoie | A01K 97/10 224/197 |
| 6,574,912 | B1 * | 6/2003 | Johnson | A01M 23/26 43/58 |
| 7,168,202 | B2 * | 1/2007 | Kohler | A01K 97/06 43/25.2 |
| 7,322,146 | B1 * | 1/2008 | Baldwin | A01K 77/00 24/16 PB |
| 7,337,577 | B1 * | 3/2008 | Ramirez | A01K 97/125 362/120 |
| 7,389,607 | B2 * | 6/2008 | Zwierski | A01K 87/007 43/25 |
| 7,412,857 | B2 * | 8/2008 | Kolton | A01K 87/06 206/315.11 |
| 7,752,800 | B2 * | 7/2010 | Leyden | A01K 87/06 43/22 |
| 7,963,065 | B1 * | 6/2011 | Copeland | A01K 97/12 43/17 |
| 8,336,249 | B2 * | 12/2012 | Newton | A01K 91/02 43/19 |
| 2006/0032107 | A1 * | 2/2006 | Yu | A01K 87/04 43/24 |
| 2007/0214704 | A1 * | 9/2007 | Wicinski | A01K 97/125 43/17 |
| 2010/0064571 | A1 * | 3/2010 | McCune | A01K 87/06 43/22 |
| 2012/0060403 | A1 * | 3/2012 | LoPresti | A01K 87/04 43/24 |
| 2015/0335000 | A1 * | 11/2015 | Rudebeck | A01K 87/007 43/18.1 CT |
| 2016/0212980 | A1 | 7/2016 | Hodges | |
| 2019/0150416 | A1 * | 5/2019 | Jeffery | A01K 87/04 |
| 2020/0253178 | A1 * | 8/2020 | Bassett | A01K 87/04 |

FOREIGN PATENT DOCUMENTS

| | | | | |
|---|---|---|---|---|
| FR | 2061891 | A5 * | 6/1971 | A01K 87/025 |
| FR | 2734123 | A1 * | 11/1996 | A01K 87/04 |
| FR | 2990594 | A1 * | 11/2013 | A01K 87/04 |
| JP | 11346605 | A * | 12/1999 | |
| JP | 2006166842 | A * | 6/2006 | |
| KR | 20110011499 | U * | 12/2011 | |

* cited by examiner

FASTENING DEVICE FOR FISHING ROD AND METHODS OF MAKING AND USING SAME

CROSS-REFERENCE TO RELATED APPLICATIONS

The present application claims priority to U.S. Provisional Application No. 62/739,668, filed Oct. 1, 2018 and titled "FASTENING DEVICE FOR FISHING ROD AND METHODS OF MAKING AND USING SAME," and U.S. Provisional Application No. 62/632,879, filed Feb. 20, 2018 and titled "QUICKCLIP," both of which are hereby incorporated by reference in their entirety.

FIELD

The presently disclosed technology relates generally to fastening devices. In one embodiment, the presently disclosed technology relates to a fastening device in the form of an eyelet attachment for use on fishing poles.

BACKGROUND AND DESCRIPTION OF RELATED ART

The fishing rod is a tool that allows anglers to feel more of what is going on with the lure, which is typically under water. A common nuisance with fishing rods is the loss or damage of a guide, which extends from the shaft of a fishing rod. Each guide directs the fishing line along the shaft of the fishing rod, allowing for accurate casts and providing immediate feedback from line and lure to the fisherman Loss of (or damage to) a guide typically results from abuse, breaking, corrosion, failing, smashing, factory defect, game force, and/or normal wear-and-tear. With multiple opportunities for damage, guides are damaged or lost on a regular basis and traditionally require a lengthy or time-consuming fix with thread and glue.

U.S. Patent Application Publication No. 2012/0060403 (LoPresti), which is incorporated by reference herein, discloses several embodiments of a replacement fishing line guide for a fishing pole. While the LoPresti designs can be beneficial, these designs are not ideal for several reasons. For example, the design shown in FIGS. 14-16 of LoPresti does not sufficiently secure or hold the guide to the fishing rod, particular when subject to heavy loads (e.g., reeling in large fish), and may not be sufficiently rigid or strong depending upon the needs of the angler.

BRIEF SUMMARY

It would be desirable to reduce or eliminate the above drawbacks of the prior art, and the presently disclosed technology overcomes the above and other challenges of the prior art.

In one embodiment, the presently disclosed technology provides an attachment device with at least one fastening eyelet. The presently disclosed technology allows for a new way of fastening eyelets to a fishing pole, for example. The presently disclosed technology allows a user to replace a lost guide on site (e.g., on a boat in the middle of a lake), thereby allowing the fisherman to keep his favorite rod in action.

In another aspect, the presently disclosed technology can include an apparatus that is removably attachable to a fishing rod. The apparatus can include a base configured to extend parallel to a shaft of a fishing rod and at least one eyelet extending outwardly from the base and the shaft of the fishing rod. Each eyelet can be configured to receive a fishing line therethrough. The apparatus can include at least one pair of legs extending outwardly from the base. Each leg can be configured to extend around at least a portion of the shaft of the fishing rod. At least one opening or passageway can extend through the base. Each passageway can be configured to receive at least a portion of a fastener therethrough.

BRIEF DESCRIPTION OF THE DRAWINGS

The foregoing summary, as well as the following detailed description of the presently disclosed technology, will be better understood when read in conjunction with the appended drawings, wherein like numerals designate like elements throughout. For the purpose of illustrating the presently disclosed technology, there are shown in the drawings various illustrative embodiments. It should be understood, however, that the presently disclosed technology is not limited to the precise arrangements and instrumentalities shown. In the drawings.

DETAILED DESCRIPTION

Figure 1:
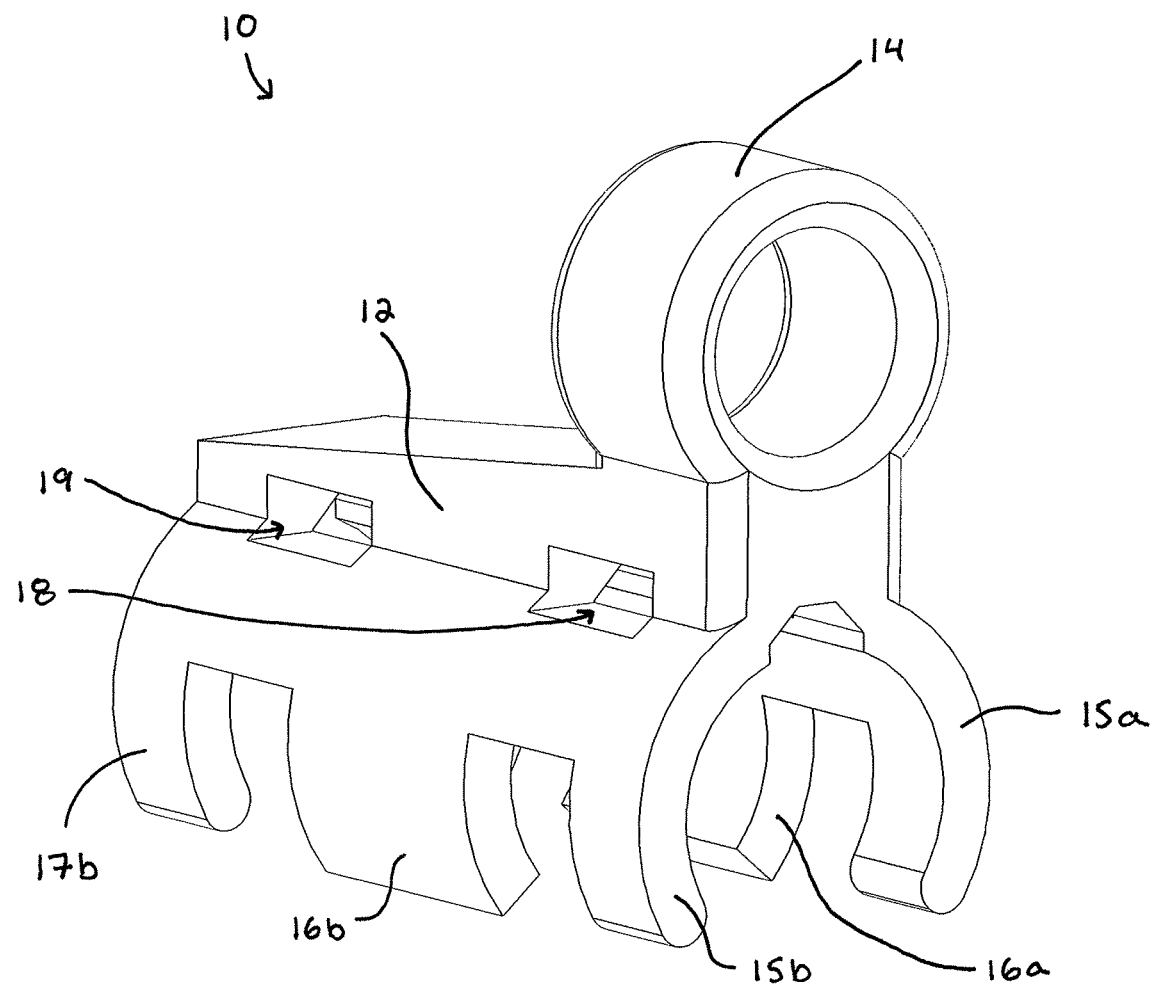
FIG. 1 is a perspective view of a fastening device according to one embodiment of the presently disclosed technology.

While systems, devices and methods are described herein by way of examples and embodiments, those skilled in the art recognize that the presently disclosed technology is not limited to the embodiments or drawings described. Rather, the presently disclosed technology covers all modifications, equivalents and alternatives falling within the spirit and scope of the appended claims. Features of any one embodiment disclosed herein can be omitted or incorporated into another embodiment.

Any headings used herein are for organizational purposes only and are not meant to limit the scope of the description or the claims. As used herein, the word "may" is used in a permissive sense (i.e., meaning having the potential to) rather than the mandatory sense (i.e., meaning must). Unless specifically set forth herein, the terms "a," "an" and "the" are not limited to one element but instead should be read as meaning "at least one." The terminology includes the words noted above, derivatives thereof and words of similar import.

Referring now in detail to the various figures, wherein like reference numerals refer to like parts throughout, FIGS. 1-7 illustrate one embodiment of an apparatus or fastening device, generally designated 10, of the presently disclosed technology. Fastening device 10 can include base or body 12, at least one eyelet 14 forming an opening therethrough and extending outwardly from the base 12, and at least one pair of legs 16a, 16b extending outwardly from the base 12 generally opposite eyelet 14. In one embodiment, fastening device 10 allows for quick and convenient repair or replacement of broken components, such as one or more eyelets, of fishing rods or other poles of all sizes.

A top surface of base 12 can be slanted or sloped (such as with respect to the shaft of the fishing rod when fastening device 10 is attached thereto). However, the presently disclosed technology is not limited to such a configuration. Further, the height or thickness of base 12 can be more or less than what is shown in the attached figures, depending upon the needs of the fisherman and/or the particular fishing rod used.

Figure 2:
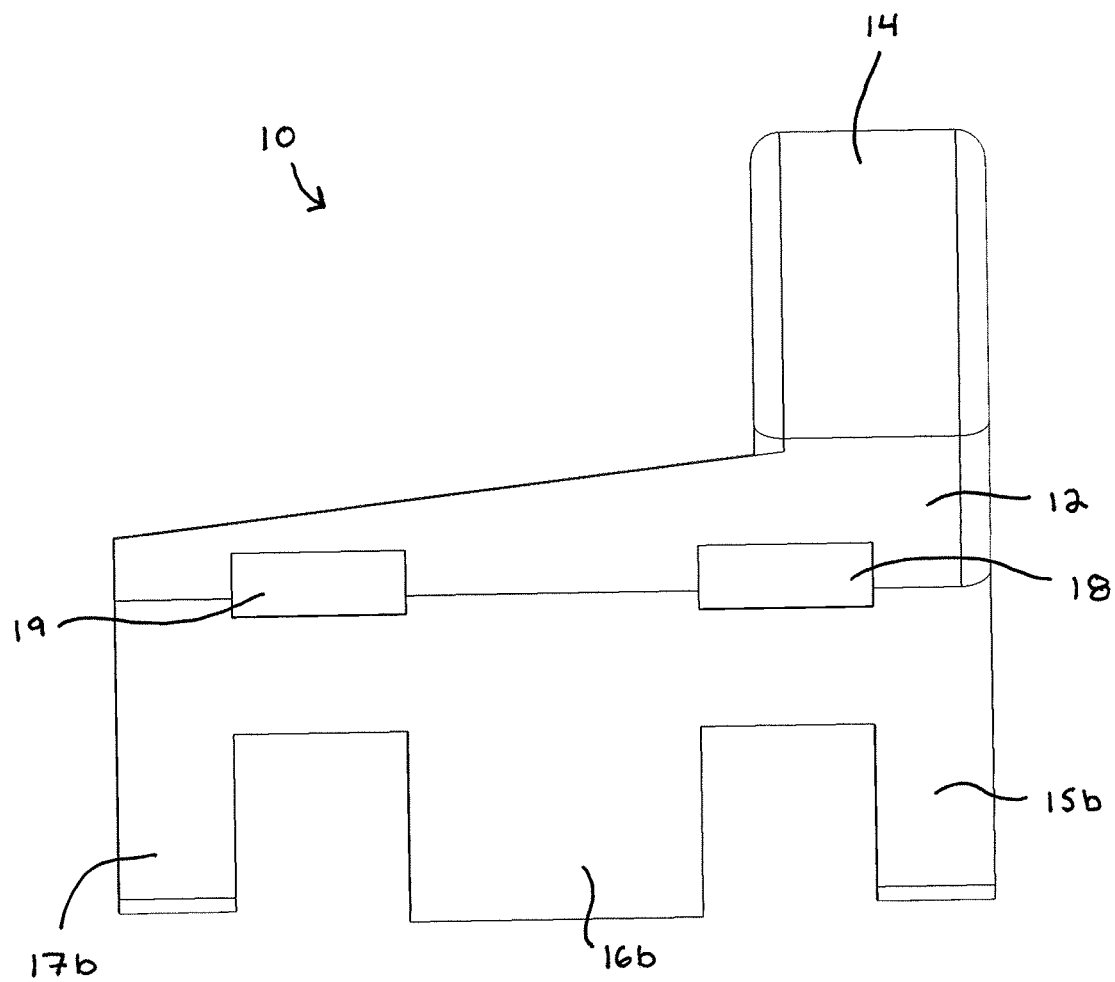
FIG. 2 is a side elevation view of the fastening device of FIG. 1.
Figure 3:
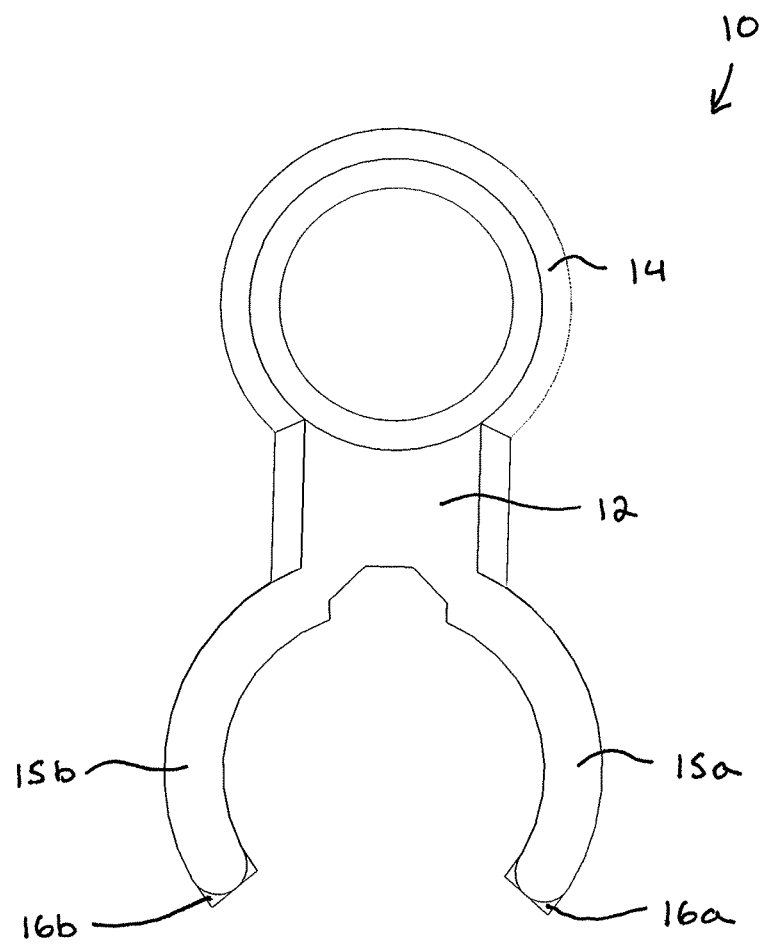
FIG. 3 is a front elevation view of the fastening device of FIG. 1.
Figure 4:
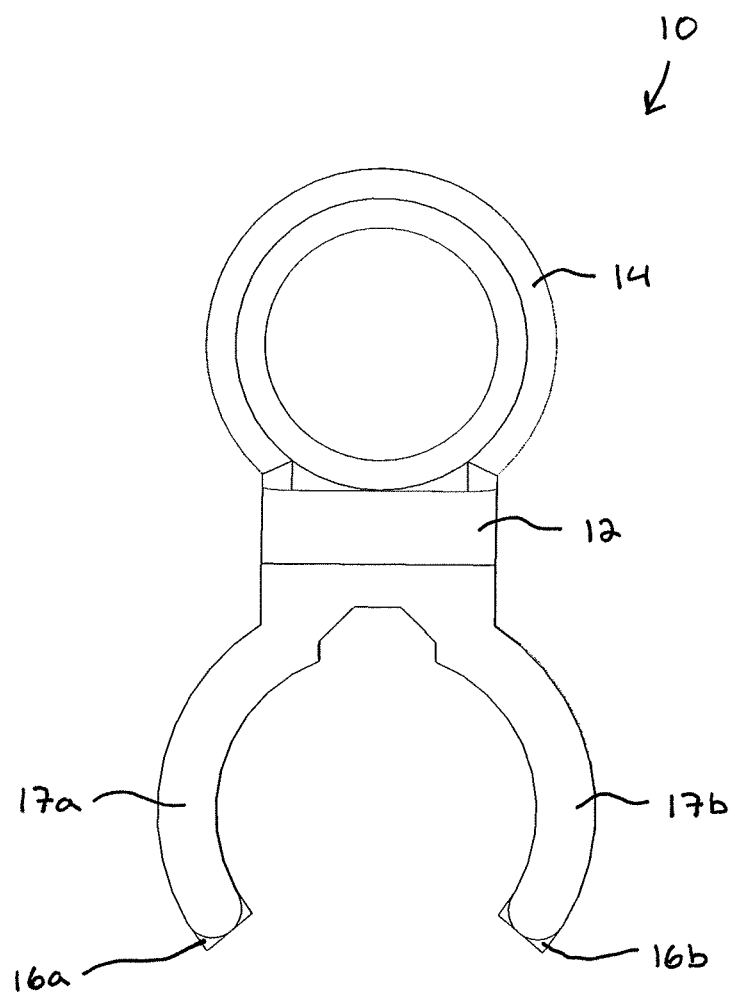
FIG. 4 is a rear elevation view of the fastening device of FIG. 1.
Figure 5:
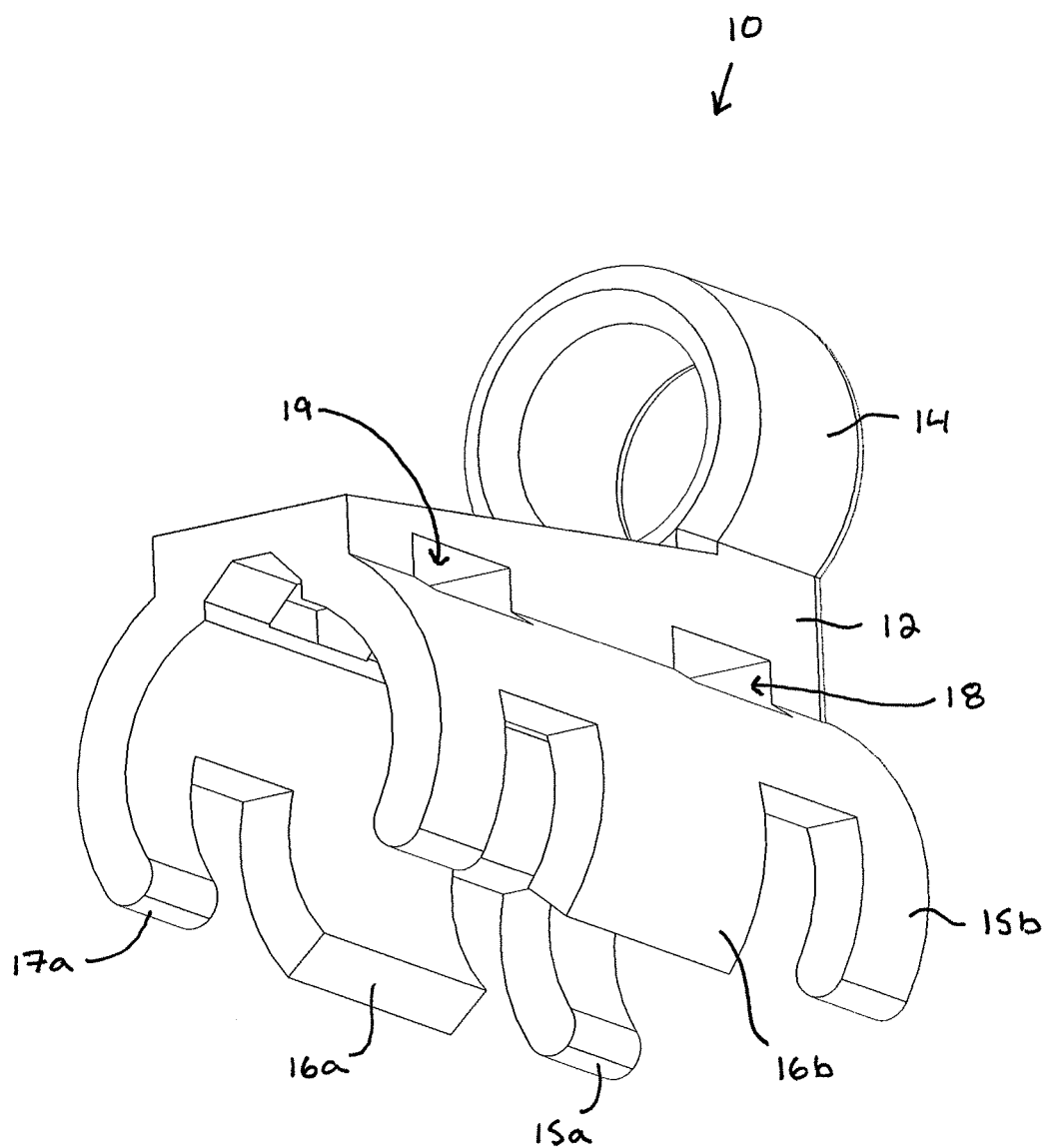
FIG. 5 is another perspective view of the fastening device of FIG. 1.
Figure 6:
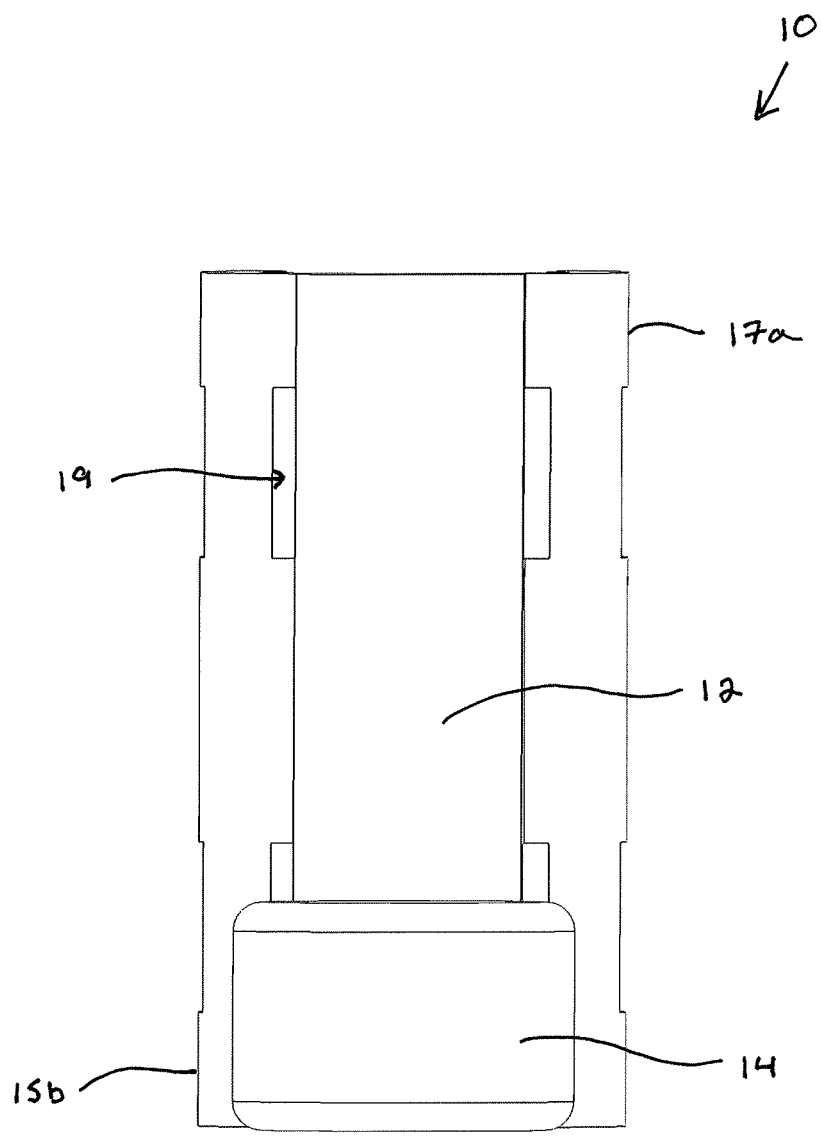
FIG. 6 is a top plan view of the fastening device of claim 1.
Figure 7:
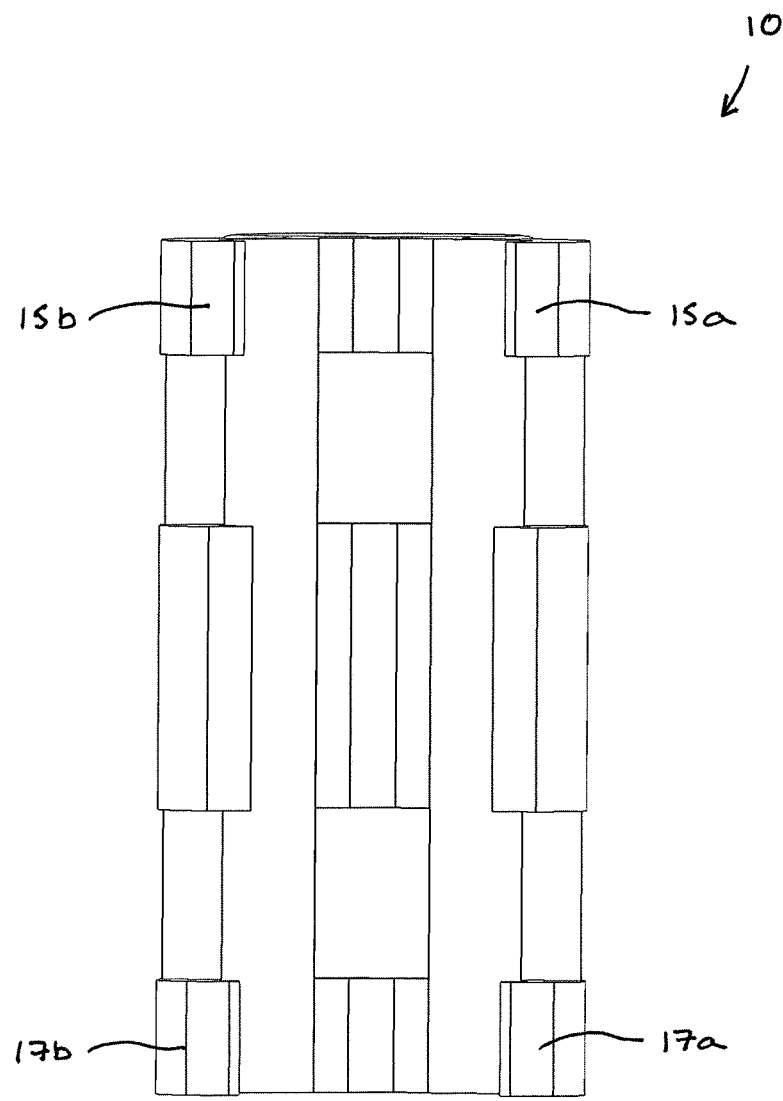
FIG. 7 is a bottom plan view of the fastening device of claim 1.

Optionally, fastening device 10 includes two, three, or more spaced-apart pairs of legs 15a, 15b, 16a, 16b, 17a, 17b. In one embodiment, middle pair of legs 16a, 16b can be symmetrically identical, but can be of a different size, shape and/or configuration from front pair of legs 15a, 15b and rear pair of legs 17a, 17b. Optionally, front pair of legs 15a, 15b can be symmetrically identical among themselves and/or with rear pair of legs 17a, 17b. As shown in FIGS. 2-4, optionally, middle pair of legs 16a, 16b can be at least slightly longer than both front and rear pair of legs 15a, 15b, 17a, 17b.

At least the interior surface of each of the legs can be arcuate to conform to and complement the arcuate surface of the fishing rod. Although the exterior surface of each of the legs is shown to be arcuate in the drawings, the presently disclosed technology is not limited in this matter, as one or more of those surfaces can be only partially arcuate, formed in a different shape, or have distinct sizes and shapes among the different legs. Optionally, the free end of at least one of the legs (e.g., front and rear pair of legs 15a, 15b, 17a, 17b) can be rounded, flat or angled.

The presently disclosed technology can simply clip onto the rod via the legs that snap-in place around at least a portion of the rod and fasten eyelet 14 to the rod. This allows the angler to immediately return to fishing, for example, upon guide or eyelet loss or breakage.

In one embodiment, adhesive, such as but not limited to double-sided tape or glue, can be placed on or attached to the fastening device. For example, adhesive can be placed in the trough between one or more pair of the legs and/or on a portion of the interior surface of one or more of the legs. The adhesive has been found to be beneficial, including but not limited to limiting side-to-side movement of the eyelet with respect to the shaft of the fishing rod (e.g., provide traction to the fastening device 10 with respect to the shaft of the fishing rod), and/or reducing the likelihood of damage to the legs.

Optionally, base 12 includes or surrounds at least one passageway, opening or hole 18 that extends therethrough. Thus, passageway 18 can be "built-in" to fastening device 10. In one embodiment, the base 12 can include a first or front passageway 18 spaced-apart from a second or rear passageway 19. In one embodiment, each passageway 18, 19 can be at least partially formed in the base and at least partially formed in the legs.

Each passageway 18, 19 can be sized, shaped and/or configured to receive at least a portion of a fastener, which can be used to help hold fastening device 10 securely to the fishing rod or other pole. In one embodiment, the fastener is a cable tie or zip tie. In one embodiment, passageway 18 can be located at a middle or center of base 12. Optionally, each passageway 18, 19 can have the cross-sectional shape of a square or rectangle or a circle or cylinder, for example, as shown in FIG. 2.

Although each passageway 18, 19 is shown to have a rectangular cross-section (see FIG. 2), the presently disclosed technology is not limited to such a configuration. For example, one or each of the passageways can have a different cross-sectional shape (such as, but not limited to, circular or square) depending upon the particular needs of the fisherman and/or type of fastener used.

Optionally, eyelet 14 can be set-back or spaced-apart at least slightly from front legs 15a, 15b. Alternatively, a front surface of eyelet 14 can be parallel or planar with a front surface of front legs 15a, 15b, as shown in FIGS. 1-7. Optionally, a neck can connect eyelet 14 to base 12.

At least a portion of fastening device 10, such as legs 16a, 16b, can include or be formed in a tri-panel design, which includes three segments or sections to create a reinforced, stronger product.

In one embodiment, at least a portion of fastening device 10, or the entire fastening device, can be formed of a blended ABS (acrylonitrile butadiene styrene) and nylon material. Optionally, at least a portion of fastening device 10, or the entire fastening device, can be formed of PEEK (polyether ether ketone) material. For example, a bearing grade PEEK material could be used or a carbon fiber infused PEEK material, which is highly abrasive resistant and lightweight. Forming fastening device of such material advantageously allows fastening device 10 to withstand high stresses (such as being stepped on) without cracking or breaking.

The presently disclosed technology also includes methods of making and/or using fastening device 10. For example, one of the methods includes pressing fastening device 10 onto the rod until fastening device 10 makes a snap noise and is secure. Optionally, to further secure fastening device 10, a safety strap slot can harness a tie to ensure a tight grip to the pole. Another of the methods includes (i) inserting at least a portion of a shaft of the fishing rod into at least one pair of legs of a fastening device, (ii) inserting a fastener through at least one opening formed in a base of the fastening device, (iii) surrounding at least a portion of the shaft of the fishing rod with the fastening device, and (iv) inserting a fishing line through an eyelet of the fastening device. In one embodiment, the fastener can be attached to itself after surrounding the shaft of the fishing rod. Optionally, the method can include applying adhesive to at least a portion of one of the legs of the fastening device prior to attaching the fastening device to the shaft of the fishing rod.

Figure 8:
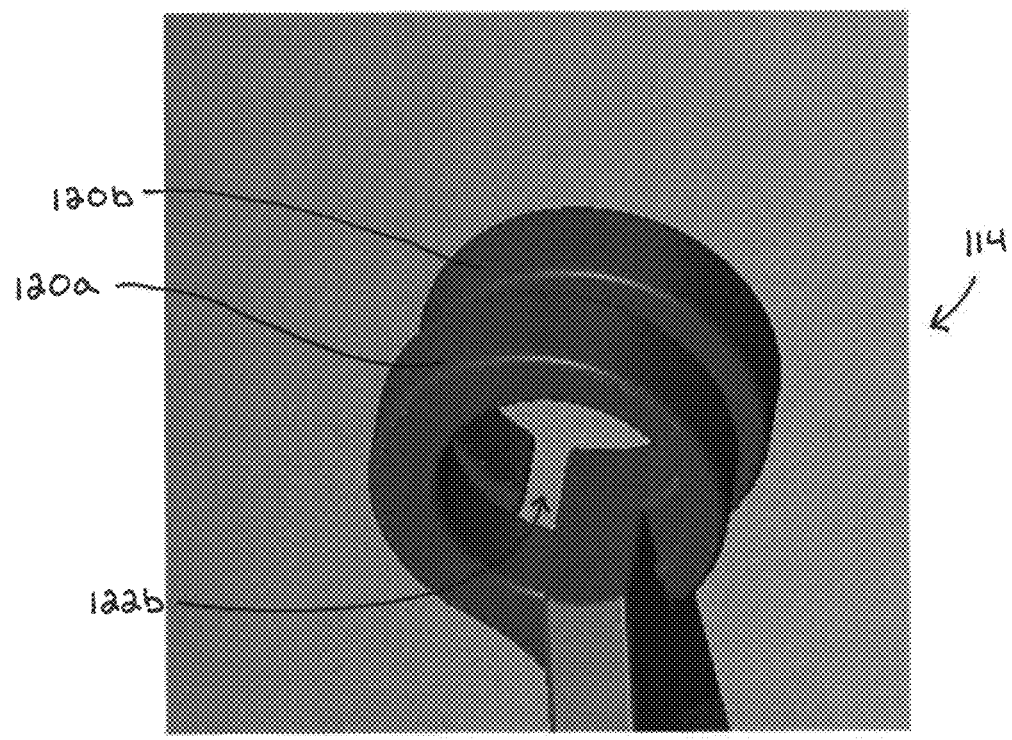
FIG. 8 is a perspective view of a portion of a fastening device according to another embodiment of the presently disclosed technology.
Figure 9:
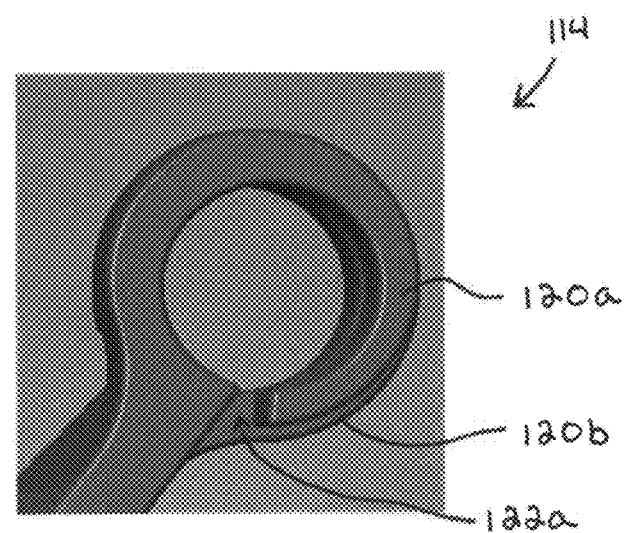
FIG. 9 is another perspective view of the portion of the fastening device of FIG. 8.

FIGS. 8 and 9 show another embodiment of eyelet 114 the presently disclosed technology. Similar or identical structure as between the embodiment of FIGS. 1-7 and the embodiment of FIGS. 8 and 9 is distinguished in FIGS. 8 and 9 by a reference number with a magnitude one hundred (100) greater than that of FIGS. 1-7. Description of certain similarities between the embodiment of FIGS. 1-7 and the embodiment of FIGS. 8 and 9 may be omitted herein for convenience and brevity only.

The design of eyelet 114 shown in FIGS. 8 and 9 allows the angler's fishing line to pass through the center of eyelet 114 without requiring that the fishing line first be cut and then re-tied after passing through eyelet 114. To provide such functionality, eyelet 114 of the present embodiment includes a dual or multi-band loop. Optionally, each of bands 120a, 120b includes opening or break 122a, 122b, respectively. The fishing line can pass through each of the breaks to enter the center of eyelet 114. Optionally, the eyelet 214 can be set at a predetermined or defined angle (e.g., approximately 70 degrees) with respect to an axis at which the base and the fishing line extend. In addition or alternatively, each or one of the passageways can be formed in a handle that extends outwardly from the base away from the fishing rod or pole.

While the presently disclosed technology has been described in detail and with reference to specific examples thereof, it will be apparent to one skilled in the art that various changes and modifications can be made therein without departing from the spirit and scope thereof. It is understood, therefore, that the presently disclosed technology is not limited to the particular embodiments disclosed, but it is intended to cover modifications within the spirit and scope of the presently disclosed technology as defined by the appended claims.

What is claimed is:

1. A fastening device configured to be attached to a shaft of a fishing rod and receive a fishing line therein to direct the fishing line along the shaft of the fishing rod, the fastening device comprising:
    at least one opening extending through a base of the fastening device, the at least one opening extending perpendicularly to the shaft of the fishing rod when the fastening device is attached to the fishing rod, the at least one opening being configured to receive at least a portion of a fastener therethrough when the fastening device is attached to the shaft of the fishing rod, the fastener extending around the shaft of the fishing rod when the fastening device is attached to the fishing rod, the fastener extends perpendicularly to the shaft of the fishing rod when the fastening device is attached to the fishing rod;
    at least one eyelet extending outwardly from the base and configured to extend away from the shaft of the fishing rod when the fastening device is attached thereto, the at least one eyelet being configured to receive the fishing line therethrough; and
    at least two spaced-apart pairs of legs extending outwardly from the base opposite the at least one eyelet, each leg being configured to extend around at least a portion of the shaft of the fishing rod when the fastening device is attached to the fishing rod,
    wherein the fastening device, when attached to the fishing rod, is configured to replace a lost or damaged guide that directs the fishing line along the shaft of the fishing rod, and
    wherein a rear surface of the at least one eyelet is spaced-apart from a rear surface of the base along a longitudinal axis of the fastening device, wherein a top surface of the base has a downward slope from the rear surface of the at least one eyelet to the rear surface of the base so as not extend parallel to the shaft of the fishing rod when the fastening device is attached to the fishing rod.

2. The fastening device of claim 1, wherein the at least two spaced-apart pairs of legs includes three spaced-apart pairs of legs.

3. The fastening device of claim 1, wherein an opening of the at least one eyelet extends perpendicularly to the at least one opening extending through the base, wherein the opening of the at least one eyelet extends parallel to the shaft of the fishing rod when the fastening device is attached to the fishing rod.

4. The fastening device of claim 1, wherein the at least one opening extending through the base of the fastening device includes at least two spaced-apart openings extending in parallel through the base of the fastening device.

5. A fastening device configured to be attached to a shaft of a fishing rod and receive a fishing line therein to direct the fishing line along the shaft of the fishing rod, the fastening device comprising:
    at least one opening extending through a base of the fastening device, the at least one opening extending perpendicularly to the shaft of the fishing rod when the fastening device is attached to the fishing rod, the at least one opening being configured to receive at least a portion of a fastener therethrough when the fastening device is attached to the shaft of the fishing rod, the fastener extending around the shaft of the fishing rod when the fastening device is attached to the fishing rod, the fastener being a cable tie or a zip tie that extends perpendicularly to the shaft of the fishing rod when the fastening device is attached to the fishing rod;
    at least one eyelet extending outwardly from the base and configured to extend away from the shaft of the fishing rod when the fastening device is attached thereto, the at least one eyelet being configured to receive the fishing line therethrough; and
    three spaced-apart pairs of legs extending outwardly from the base opposite the at least one eyelet, each leg being configured to extend around at least a portion of the shaft of the fishing rod when the fastening device is attached to the fishing rod,
    wherein the fastening device, when attached to the fishing rod, is configured to replace a lost or damaged guide that directs the fishing line along the shaft of the fishing rod, and
    wherein a middle pair of the three spaced-apart pairs of legs has a different shape than a front pair and a rear pair of the three spaced-apart pairs of legs, and wherein the front pair and the rear pair of the three spaced-apart pairs of legs have the same shape.

6. A fastening device configured to removably attach to a shaft of a fishing rod and receive a fishing line therein to direct the fishing line along the shaft of the fishing rod, the fastening device comprising:
    two spaced-apart openings each extending through a base of the fastening device, each of the openings extending in parallel, each of the openings being configured to receive at least a portion of a cable tie or zip tie therethrough when the cable tie or zip tie is wrapped around the shaft of the fishing rod when the fastening device is attached to the fishing rod, each of the openings having a square or rectangular cross-sectional shape;
    at least one eyelet extending outwardly from the base and configured to extend away from the shaft of the fishing rod when the fastening device is attached thereto, the at least one eyelet being configured to receive the fishing line therethrough, an opening of the at least one eyelet extending perpendicularly to each of the openings extending through the base, the opening of the at least one eyelet having a circular cross-sectional shape; and
    three spaced-apart pairs of legs extending outwardly from the base opposite the at least one eyelet, each leg being configured to extend around at least a portion of the shaft of the fishing rod when the fastening device is attached to the fishing rod, an interior surface of each of the legs being arcuate to conform to and complement an arcuate surface of the shaft of the fishing rod, a middle pair of the three spaced-apart pairs of legs having a different shape than a front pair and a rear pair of the three spaced-apart pairs of legs, the front pair and the rear pair of the three spaced-apart pairs of legs having the same shape, wherein a top surface of the base has a constant downward slope from a rear surface of the at least one eyelet to a rear surface of the base so as not to extend parallel to the shaft of the fishing rod when the fastening device is attached to the fishing rod; and wherein the fastening device, when attached to the fishing rod, is configured to replace a lost or damaged guide that directs the fishing line along the shaft of the fishing rod.

7. The fastening device of claim 6, wherein a front surface of the at least one eyelet is coplanar with a front surface of the front pair of the three spaced-apart pairs of legs.

8. The fastening device of claim 7, wherein each pair of the three spaced-apart pairs of legs does not extend around an entire circumference of the shaft of the fishing rod when the fastening device is attached to the fishing rod.

9. The fastening device of claim 8, wherein the rear surface of the base is coplanar with a rear surface of the rear pair of the three spaced-apart pairs of legs.

10. The fastening device of claim 9, wherein a front surface of the base is coplanar with the front surface of the at least one eyelet.

\* \* \* \* \*